United States Patent [19]
Schultz et al.

[11] Patent Number: 5,658,470
[45] Date of Patent: Aug. 19, 1997

[54] DIAMOND-LIKE CARBON FOR ION MILLING MAGNETIC MATERIAL

[75] Inventors: Allan E. Schultz, St. Paul; L. Vincent Ruscello; William H. Nunne, both of Burnsville, all of Minn.

[73] Assignee: Seagate Technology, Inc., Scotts Valley, Calif.

[21] Appl. No.: 571,395

[22] Filed: Dec. 13, 1995

[51] Int. Cl.⁶ .................... B44C 1/22; C23F 1/00
[52] U.S. Cl. .................... 216/22; 216/47; 216/51
[58] Field of Search .................... 216/22, 41, 47, 216/51, 66, 75; 360/113, 123, 126; 29/603

[56] References Cited

U.S. PATENT DOCUMENTS

| | | | |
|---|---|---|---|
| 4,052,749 | 10/1977 | Nomura et al. | 360/123 |
| 5,087,608 | 2/1992 | Chan et al. | 216/51 X |
| 5,271,802 | 12/1993 | Chang et al. | 216/22 |
| 5,363,265 | 11/1994 | Hsie et al. | 360/113 |
| 5,378,316 | 1/1995 | Franke et al. | 216/51 X |

FOREIGN PATENT DOCUMENTS

| | | |
|---|---|---|
| 0 493 902 A2 | 7/1992 | European Pat. Off. |
| 0 584 707 A2 | 2/1994 | European Pat. Off. |
| 2 064 849 | 6/1981 | United Kingdom |
| WO 95/18442 | 7/1995 | WIPO |

OTHER PUBLICATIONS

Patent Abstracts of Japan, vol. 9, No. 79 (P-347) (1802) 9 Apr. 1985 & JP,A,59 210 520 (Yukio Ichinose) 29 Nov. 1984.

Patent Abstracts of Japan, vol. 11, No. 211 (P-594) 9 Jul. 1987 & JP,A,62 033 317 (Matsushita Electric Ind Co Ltd) 13 Feb. 1987.

Patent Abstracts of Japan, vol. 16, No. 430 (P-1417) 9 Sep. 1992 & JP,A,04 147 411 (Mitsubishi Electric Corp) 20 May 1992.

Patent Abstracts of Japan, vol. 13, No. 167 (P-861) 20 Apr. 1989 & JP,A,01 004 913 (NEC Kansai Ltd) 10 Jan. 1989.

Patent Abstracts of Japan, vol. 11, No. 91 (P-558) (2538) 23 Mar. 1987 & JP,A,61 242 313 (Hitachi Ltd) 28 Oct. 1986.

Patent Abstracts of Japan, vol. 11, No. 49 (P-547) 14 Feb. 1987 & JP,A,61 216 109 (Matsushita Electric Ind Co Ltd) 25 Sep. 1986.

IBM Technical Disclosure Bulletin, vol. 31, No. 12, May 1989, Armonk, N.Y., US, pp. 317–318. "Low Stress Dielectric Coatings for Copper Parts".

IBM Technical Disclosure Bulletin, vol. 34, No. 2, Jul. 1991, Armonk, N.Y., US, pp. 19–20, "Thermal Ink Jet Heater Devices Incorporating Diamond–Like Carbon Films As Protective Overcoats".

Primary Examiner—William Powell
Attorney, Agent, or Firm—Kinney & Lange, P.A.

[57] ABSTRACT

A diamond-like carbon mask is formed on the surface of the magnetic material for ion-milling the magnetic material into a magnetic pole of a transducer. The mask is formed by depositing a layer of diamond-like carbon over the magnetic material. Successive layers of photoresist, SiO₂ and photoresist are applied over the magnetic material. The second layer of photoresist is patterned in the shape of the pole being formed. The exposed insulating layer is etched with an etchant that does not attack the diamond-like carbon, the exposed portions of the photoresist are exposed and removed, and the exposed portion of the diamond-like carbon is etched with an oxygen etchant. The remaining photoresist is washed away to remove the remaining insulating material. In one form of the invention, a layer of SiO₂ may additionally be formed over the diamond-like carbon to protect the diamond-like carbon from being affected by any undercut of the photoresist by the oxygen etchant. The SiO₂ layer is etched prior to etching the diamond-like carbon. The mask is used to ion mill the magnetic material to the desired pole.

13 Claims, 6 Drawing Sheets

DIAMOND-LIKE CARBON FOR ION MILLING MAGNETIC MATERIAL

BACKGROUND OF THE INVENTION

This invention relates to a process for forming a mask for use in ion milling magnetic material, and particularly for use in ion milling the shape of poles in thin film magnetic heads.

Thin film heads employ top and bottom pole pieces separated at the air-bearing surface by a thin layer of insulating material forming the gap. Portions of a coil pass between the magnetic poles distal from the air-bearing surface. The coil portions are separated from the magnetic poles by insulating material.

Reference is made to U.S. application Ser. No. 08/331, 684 filed Oct. 31, 1994 for "Thin Film Head Design Improving Top Pole Width Control" by Stageberg et at. and assigned to the same assignee as the present application, which is incorporated herein by reference. The Stageberg et at. application describes the problem of formation of "hills" between the coil region and the air-bearing surface in thin film heads. The "hill" is the result of the coils forming a thicker portion to the head. Certain layers employed in the processing of the head are formed by a spin coating process whereby the layer of material is applied to the wafer in which the head (and others) is being formed and the wafer is spun to cause the material to spread out across the wafer. However, as explained in the Stageberg et at. application, the presence of the hill on the head causes the spun layer to be applied unevenly to the head. One example of a spin-coated layer is the photoresist mask used to pattern the desired shape of the pole in an ion milling process. A patterned photoresist is applied to the top pole of each head, and the wafer (and heads) is ion milled to simultaneously remove photoresist and unwanted magnetic material, resulting in the pole shaped to the desired configuration. It is important that the photoresist layer have an even thickness over the shape being milled. However, the photoresist, being applied by a spin coating process, is thinner at the hill than at other portions of the mask. As a result, a risk exists that the photoresist will be completely milled away at the hill region, resulting in unwanted milling of the top pole material and deterioration of the top pole.

Some success has been accomplished using metal masks. Metal is deposited onto the top pole and a photoresist is applied to the metal layer by a spin coating process. The photoresist is then patterned to the desired pole shape. The metal is etched to finish the mask, usually with a wet etchant, by argon ion milling or by reactive ion etching using a fluoride. One advantage of the metal mask is that the metal has a mill rate of about one-half that of magnetic material (compared to photoresist which has a mill rate about equal to that of magnetic material). Consequently, the metal forming the ion milling mask need only be about one-half the thickness of a corresponding photoresist mask. Since the metal mask is milled at a rate slower than the magnetic material, greater control can be achieved over the milling conditions than can be accomplished using photoresist masks. Another advantage of metal masks is that they are evenly deposited onto the pole material, rather than spin coated, thereby avoiding the disadvantages of spin coating.

However, metal masks are not without problems. Particularly, if the metal is patterned or etched using a wet etchant which also attacks the magnetic material forming the top pole, the risk exists that if the process of forming the metal mask is not precisely controlled, the top pole may be etched, resulting in deterioration of the top pole. There is, accordingly, a need for a mask providing greater control over mask thickness for purposes of ion milling the top pole of a thin film head.

SUMMARY OF THE INVENTION

The present invention is directed to a diamond-like carbon mask formed on the surface of the magnetic material for purposes of ion-milling the magnetic material into a magnetic pole of a transducer.

One aspect of the present invention is a process of forming a mask useful for ion-milling a magnetic material. More particularly, a mask layer containing diamond-like carbon is deposited over the magnetic material. A layer of photoresist is applied over the mask layer, and a layer of insulating material is applied over the layer of photoresist. A second layer of photoresist is applied over the insulating material. The second layer of photoresist layer is patterned to expose selected portions of the layer of insulating material in the pattern in the pole being formed. The exposed portions of the insulating material are removed, preferably by a gaseous fluorine containing etchant. The exposed portions of the diamond-like carbon mask are then etched to expose portions of the magnetic material. The remaining photoresist is washed away to remove the remaining insulating material. The resulting mask contains diamond-like carbon defining the pole.

According to an optional form of the invention, the mask layer comprises a first layer of diamond-like carbon on the magnetic material and a second layer of insulating material over the layer of diamond-like carbon. The exposed portions of the mask layer are removed in two steps, first to remove the exposed portions of the insulating layer and then to remove the exposed portions of the diamond-like carbon. The resulting mask is a layered mask of diamond-like carbon and insulating material.

In accordance with another form of the present invention, a process for ion-milling a magnetic material includes forming a patterned mask on the magnetic material, the mask including a layer of diamond-like carbon having a thickness of about 30% the thickness of the magnetic layer. The exposed magnetic material and mask are ion-milled to shape the magnetic material to the desired pole.

In accordance with another form of the present invention, the diamond-like carbon is used to impede ion milling too deeply into an insulating layer. More particularly, a diamond-like carbon layer is included in an insulating underlayer for a soft adjacent layer in an MR head so that when ion milling the SAL using a photoresist mask, milling of the underlayer is minimized.

DETAILED DESCRIPTION OF THE PREFERRED EMBODIMENTS

Figure 1:
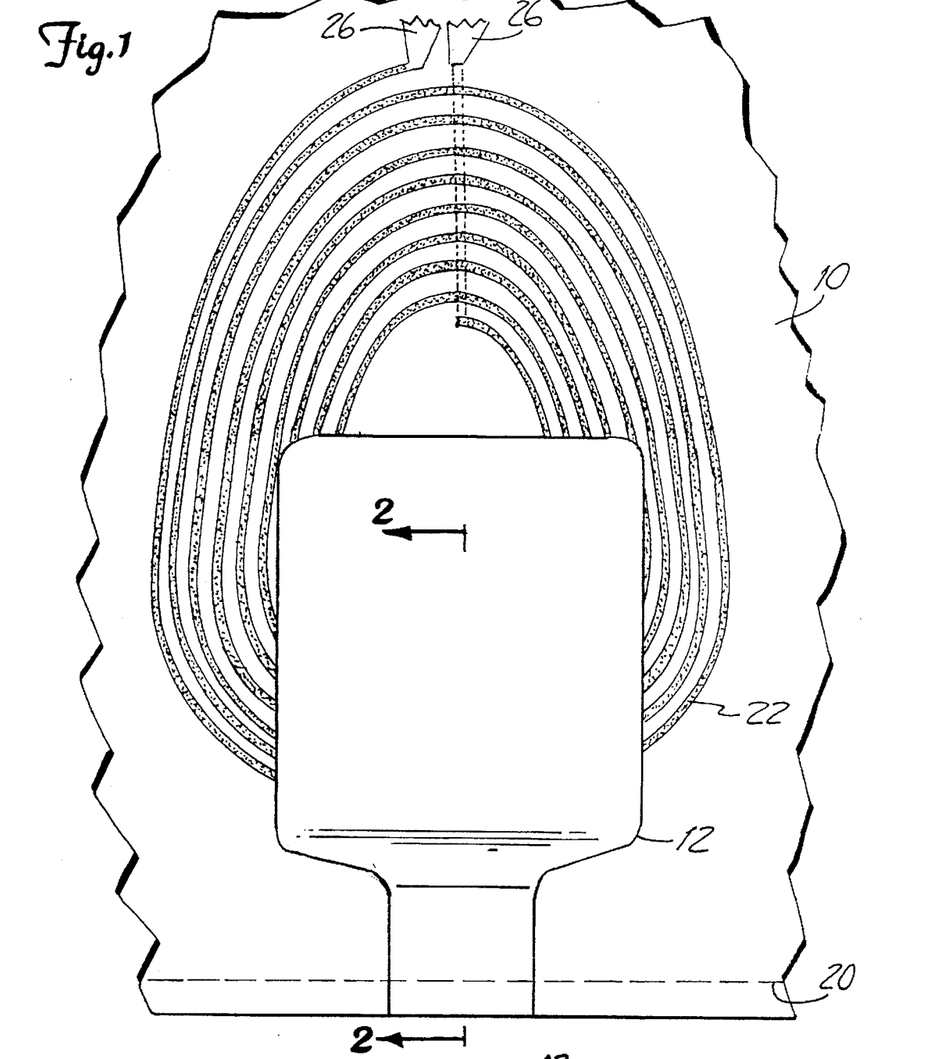
FIG. 1 is a top view of a thin film head and coil on a surface of a substrate.
Figure 2:
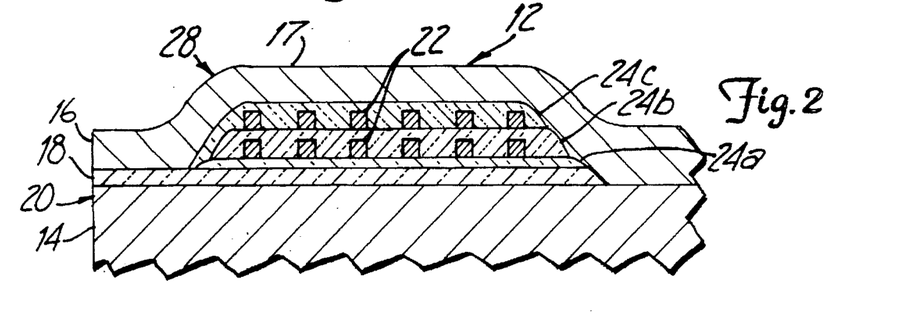
FIG. 2 is a section view of the head shown in FIG. 1, taken at line 2—2 in FIG. 1.

FIGS. 1 and 2 illustrate a thin film head having a pole piece ion-milled in accordance with either the process of the present invention, or that of the prior art. The resulting head structure is intended to be identical regardless of which process is employed, although some discernable defects may be evident in heads produced in accordance with the prior art. In either case, the head employs a substrate 10 onto which a thin film magnetic transducer 12 is formed. The transducer includes a bottom pole 14 and a top pole 16 separated by a layer 18 of insulating material forming a gap at the air-bearing surface 20. Layers 14 and 16 abut each other at the back gap distal from air-bearing surface 20. Typically, the head is fabricated on substrate or wafer 10 and cut or diced at line 20 to form an air-bearing surface. Coil 22 passes through the head and between poles 14 and 16. Successive layers of coil 22 are insulated from each other and from poles 14 and 16 by successive insulating layers 24a, 24b, and 24c. As shown particularly in FIG. 1, coil 22 terminates at terminals 26 for connection to the read/write circuits of the disc drive. Also as shown in FIG. 2, a "hill" 28 is formed by the coil region 22 where the thickness of head 12 is greater than at the air-bearing surface 20. Hill 28 forms the transition between the two elevations.

As described in the aforementioned Stageberg et al. application, it is difficult to maintain a uniform thickness of layers spin-coated onto the top surface 17 of magnetic layer 16. As a result, layers formed on and above layer 16 tend to be thinnest in the region of hill 28. While the Stageberg et at. application describes a mechanism for increasing the thickness of layers in the region of hill 28, it is still desirable to provide other techniques for overcoming the problem of the hill.

Figure 3A:
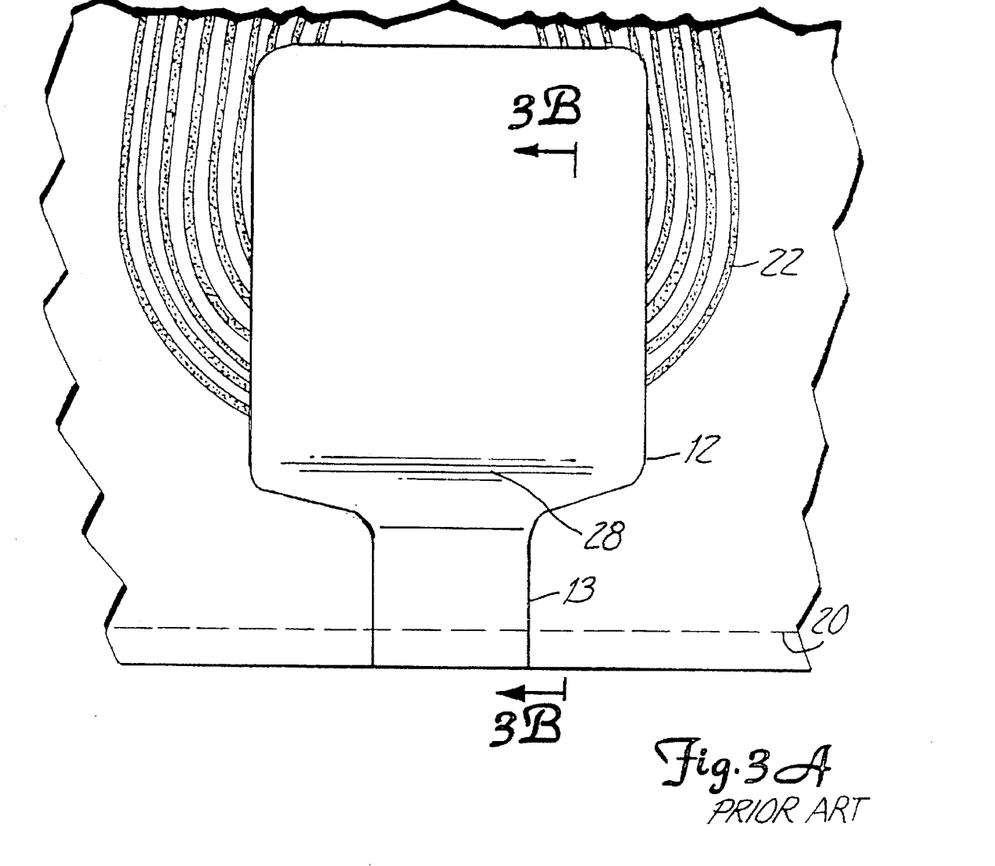
FIG. 3A is a top view of a typical thin film head.

FIG. 3A illustrates a typical thin film head prior to having been cut at line 20 to form the air-bearing surface. The hill is located generally at reference numeral 28.

Figure 3B:
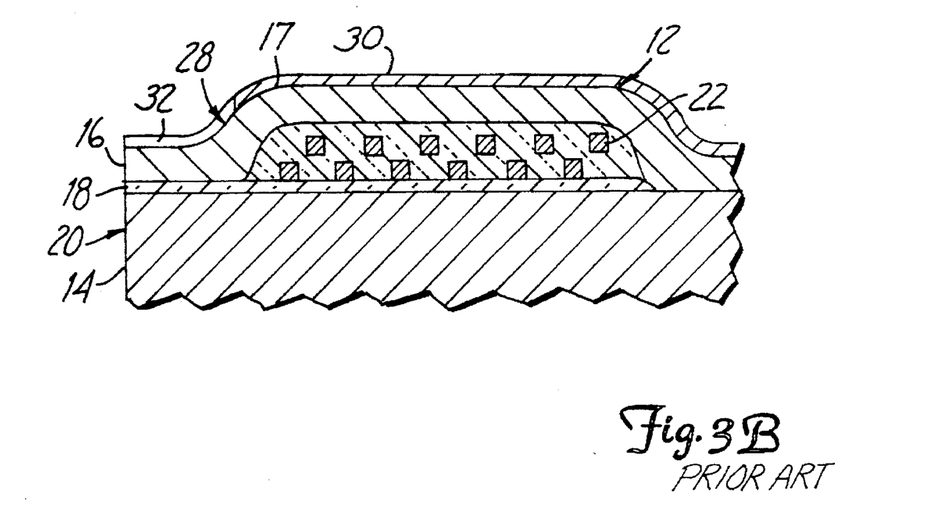
FIGS. 3B and 3C illustrate a process for ion-milling the magnetic pole for the head illustrated in FIG. 3A.
Figure 3C:
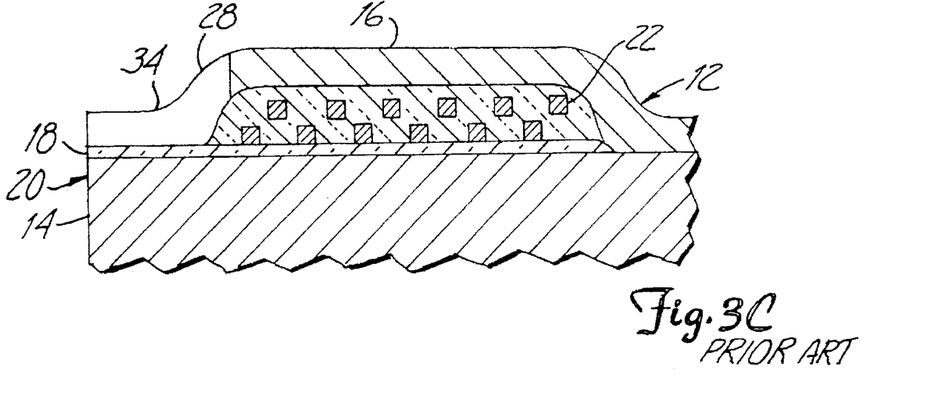

FIG. 3B is a section view of the head 12 taken at line 3B—3B in FIG. 3A, illustrating a mask for ion-milling the shape of the top pole of head 12. As shown particularly in FIG. 3A, the section view of FIG. 3B is taken along the shoulder, and not through the active region of the head. The bottom pole 14 and insulator layer 18 may be of the same shape as the top pole or may be larger, as shown. In either case, the principles of ion-milling the top pole are the same. As shown in FIG. 3B, a mask layer 30 has been applied to the top surface 17 of top pole 16. Mask 30 has been patterned, as at 32, in the shape shown in FIG. 3A, to expose magnetic material of top pole 16. Thus, it is the material of pole 16 exposed by pattern 32 in mask 30 that is to be ion-milled away. Thus, as shown in FIG. 3C, which is also taken along line 3B—3B in FIG. 3A, a void 34, corresponding to the region outside of the shoulder 13 of pole 16, is formed by the ion-milling process. In the ion-milling process, both the mask 30 and the exposed portions of the magnetic material of layer 16 are milled away by ion milling process. Thus, it is important that mask 30 be of such thickness, and of such material, that the mask is not completely milled away before completion of milling of the pole.

In the prior art, the photoresist mask was applied by a spin-coating technique in which the material of the mask was applied to the surface of a wafer containing head 12 being produced and the wafer was spun to spread out the coating of mask material over the surface. However, as described in the aforementioned Stageberg et at. application, the spreading of the material is not altogether even, particularly at the region of the hills, where the material becomes thinner than in other regions. While metal masks, which are deposited rather than spin-coated, overcome the problems associated with spin coating, metal masks are patterned using etchants that also attack the magnetic pole being formed, making the process difficult to accurately control.

It is desirable to employ masks having mill rates substantially lower than that of the magnetic material. Photoresist has a mill rate approximately the same as an iron/nickel magnetic material. Metal masks, when milled, typically have mill rates about one-half that of iron/nickel magnetic material. With a 50 percent safety factor, the thickness of a photoresist mask would be about 1.5 times the thickness of the magnetic material being milled, whereas a metal mask would have a thickness of about two-thirds the thickness of the corresponding magnetic material. In the case of photoresist, there some loss of control at the hill region 28. In the case of metal masks, great precision is required to prevent damage to the pole when patterning the mask.

The present invention is directed to the use of a diamond-like carbon mask in place of a photoresist or metal mask for use in ion-milling. More particularly, the present invention deals with the formation of a patterned diamond-like carbon mask on the top pole piece of a thin film magnetic head. The diamond-like carbon is advantageous over photoresist in that diamond-like carbon is deposited onto the wafer, rather than applied by a spin coating process. The diamond-like carbon is advantageous over metal masks in that diamond-like carbon is etched with oxygen etchants that do not attack the other layers of the head.

Like the metal mask, the diamond-like carbon is patterned using a photoresist. However, mere substitution of diamond-like carbon for metal is not possible because the photoresist used to pattern the diamond-like carbon is subject to attack by the oxygen etchant employed to etch the diamond-like carbon. Hence, the process according to the present invention is illustrated in FIGS. 4A–4F.

Figure 4A:
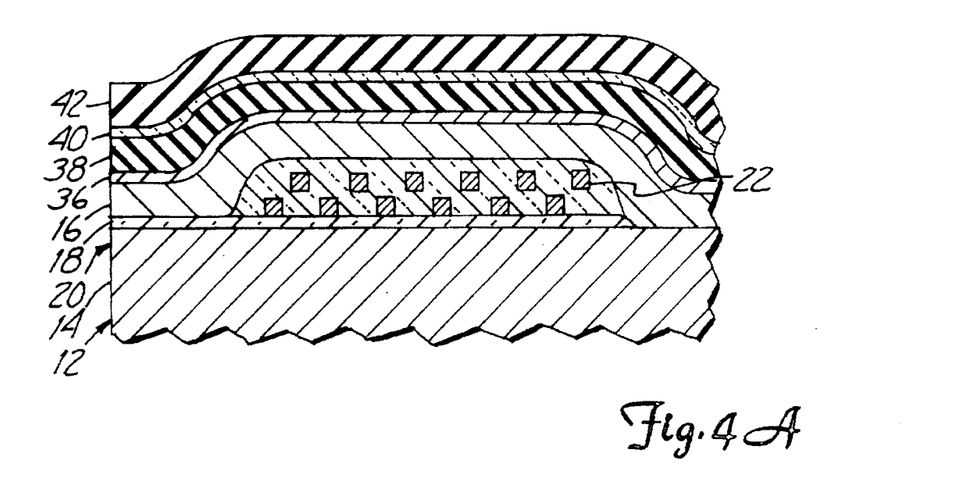
FIGS. 4A–4F illustrate the process of forming a diamond-like carbon mask in accordance with the presently preferred embodiment of the preferred invention.
Figure 4B:
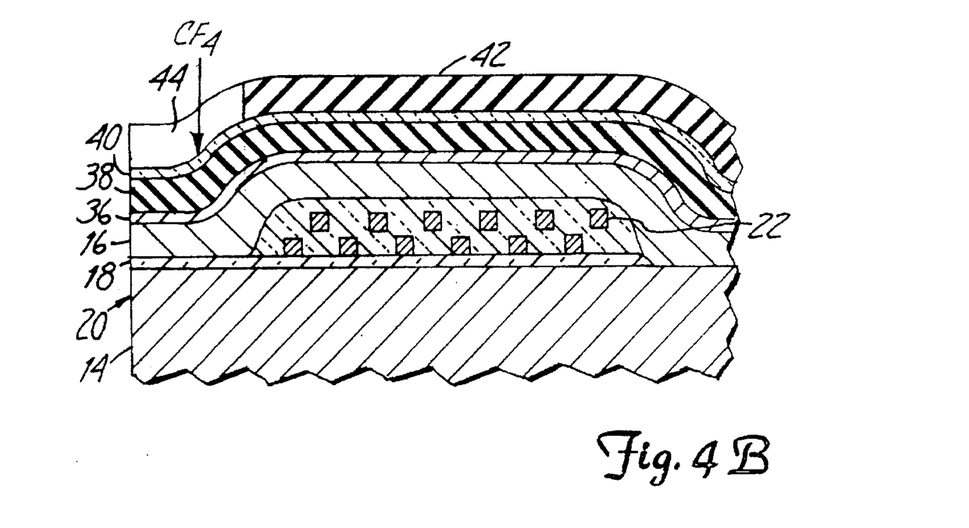
Figure 4C:
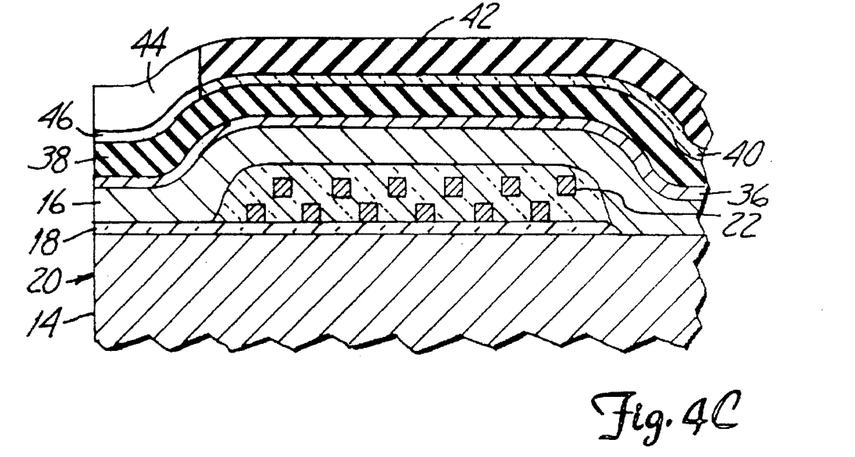
Figure 4D:
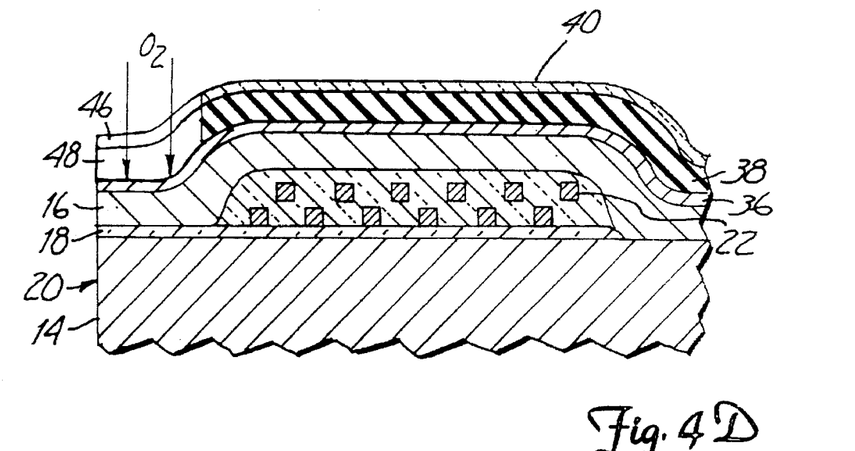
Figure 4E:
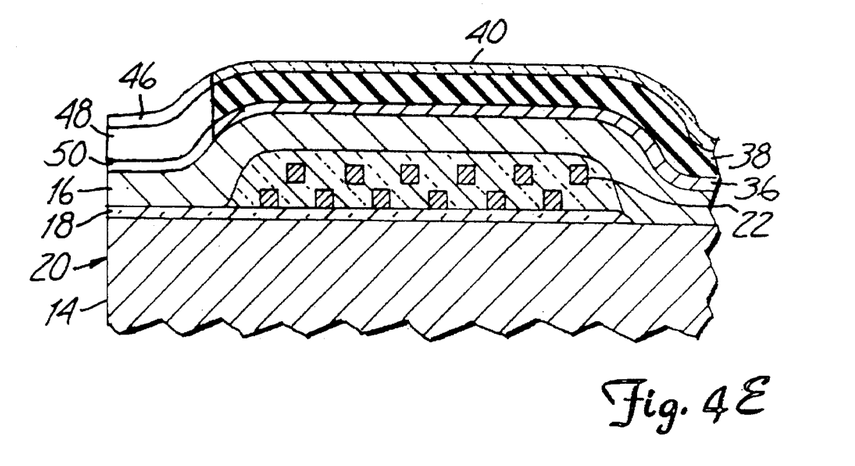

As shown in FIG. 4A, magnetic head 12 is shown with a bottom pole 14, top pole 16, and insulating gap layer 18. Coils 22 forms the "hill" 28 between coils 22 and air-bearing surface 20. The formation of the mask on the top surface of pole 16 is accomplished first by applying a layer 36 of diamond-like carbon to the top (exposed) surface of pole 16. A layer 38 of photoresist is applied over the layer 36 of diamond-like carbon and a layer 40 of insulating material, such as silicon dioxide ($SiO_2$), is applied over layer 38. Finally, layer 42 of photoresist is applied over layer 40. As shown in FIG. 4B, layer 42 is patterned to the shape of the desired pole piece (such as shown in FIG. 3A). Patterning layer 42 is usually accomplished by exposing the photoresist to light through a photomask and washing away the exposed portions of the mask at 44, leaving a portion of layer 40 exposed. A fluoride etchant, such as $CF_4$, is applied to the exposed portions of layer 40 to remove the silicon dioxide at 46 exposed by the photoresist layer 42, thereby exposing photoresist layer 38, as shown in FIG. 4C. That much of photoresist layer 40 exposed through opening 46 and all of the remainder of photoresist layer 42 are exposed to light, and washed away, as shown in FIG. 4D. At this point, the diamond-like carbon layer 36 is exposed through exposed portion 48 of layer 38 in the pattern of the desired pole piece, with protected regions of the pole still being covered by photoresist 38 and silicon dioxide layer 40. The fluoride etchant used to etch the silicon dioxide will not attack the diamond-like carbon layer 36.

Figure 4F:
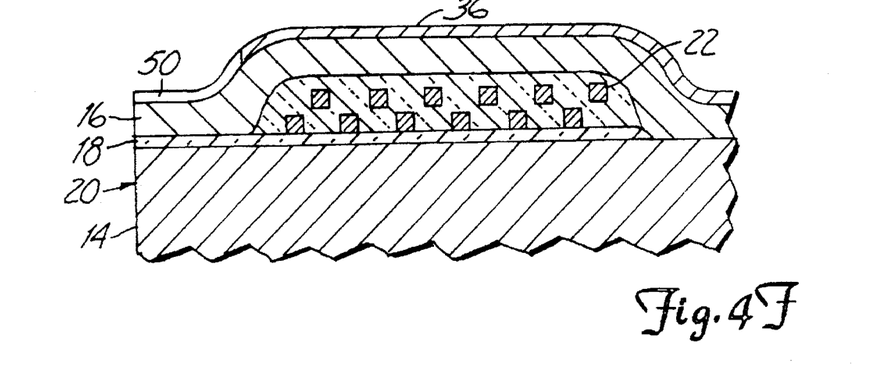

As shown particularly in FIG. 4D, an anisotropic oxygen etchant is applied to the exposed portions of layer 36 to thereby expose the high moment magnetic layer 16 (FIG. 4E) through removed portion 50 in diamond-like carbon layer 36. The remainder of photoresist layer 38 is dissolved, carrying away with it the remainder of the silicon dioxide layer 40, thereby leaving mask 36 patterned at 50, as shown in FIG. 4F. The structure may now be ion milled as described in connection with FIGS. 3B and 3C to ion mill layer 16 to the pattern of mask 36 to achieve the desired pole piece.

Diamond-like carbon is commercially known as "DLC" and is commercially available from a variety of sources. The diamond-like carbon is similar to diamond in physical properties. The material is a hydrogenated carbon typically having a hydrogen content between about 30 to 50 percent and a large fraction of $sp^3$ carbon-carbon bonds rather than $sp^2$ found in ordinary graphite. The material is typically formed from a hydrogenated carbon feedstock, such as methane ($CH_4$), processed by any of a variety of processes, such as an ion beam deposition process. It is theorized that during formation of diamond-like carbon, hydrogen is removed from the feedstock material forming a network of $sp^3$ bonded carbon atoms, rather than an ordered array of $sp^2$ bonded carbon, i.e. graphite. The material resembles a hard, highly cross-linked polymer and exhibits a higher thermal conductivity than common electrical insulating material (such as $SiO_2$ or $Al_2O_3$) and a high electrical resistivity, of the order of about $10^{10}$ Ω-cm. Diamond-like carbon films are similar to diamonds in that they exhibit very high hardness ranges (1,000 to 5,000 on the Vickers hardness scale), a low coefficient of friction (of the order of less than 0.1) and densities between about 1.7 and 2.2. The material is commercially referred to as "diamond-like" because of its similarity in characteristics to natural and synthetic diamond. Moreover, like natural and synthetic diamond, the diamond-like carbon exhibits a high resistivity. An advantage of the diamond-like carbon mask is that the mask may be removed with an oxygen etchant without affecting the magnetic layer or other parts of the fabricated head.

Table 1 compares the relative mill rate for each of an iron/nickel magnetic material, photoresist, metal and diamond-like carbon (DLC). As shown in Table 1, the mill rate for magnetic material is about the same as a photoresist, twice as fast as metal, and about five times that of diamond-like carbon. Hence, for a top pole piece having a thickness of about 3 microns and assuming a 50 percent safety factor, the thickness of a photoresist mask should be about 4.5 microns, whereas a thickness of a metal mask should be about 2.25 microns and a thickness of a diamond-like carbon mask should be about 0.9 microns. Hence, diamond-like carbon layer 36 has a thickness of about 0.9 microns for a 3 micron thick top pole 16, or about 30% of the thickness of the pole.

TABLE I

|  | Fe/Ni | Resist | Metal | DLC |
| --- | --- | --- | --- | --- |
| Relative Mill Rate | 5 | 5 | 2.5 | 1 |
| Mask Thickness (μm) |  | 4.5 | 2.25 | 0.9 |

One problem associated with the process illustrated in FIGS. 4A–4F is that if the etch rate of the diamond-like carbon is too slow, some undercutting of photoresist layer 38 may occur during the oxygen etchant step. For example, and with reference to FIGS. 4D and 4E, if, as the diamond-like carbon layer 36 is etched, some of the oxygen etchant attacks the photoresist layer 38, there may be some undercutting of the photoresist layer. If this occurs, additional carbon-like layer 36 is exposed to the oxygen etchant, which could affect the feature lines of the mask being produced. While this problem is usually avoided using an anisotropic oxygen etchant to provide very straight side walls, FIGS. 5A–5D illustrate a modification of the process illustrated in FIGS. 4A–4F to overcome this problem.

Figure 5A:
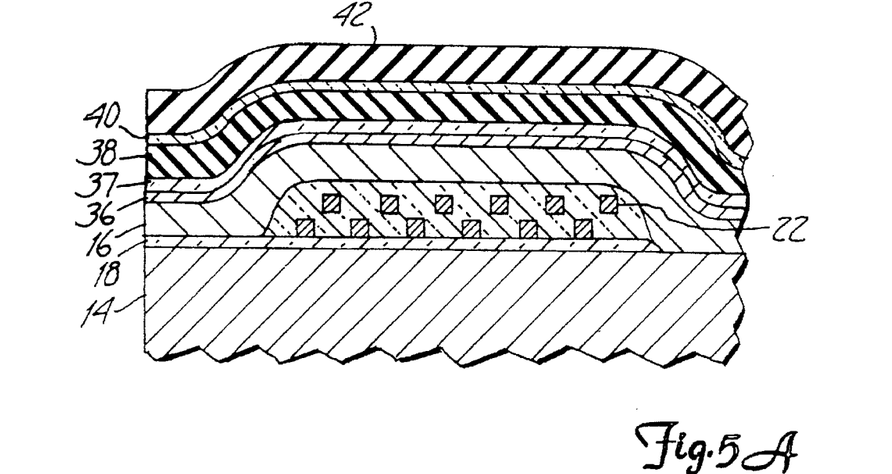
FIGS. 5A–5D illustrate a modification of the process illustrated in FIGS. 4A–4F.
Figure 5B:
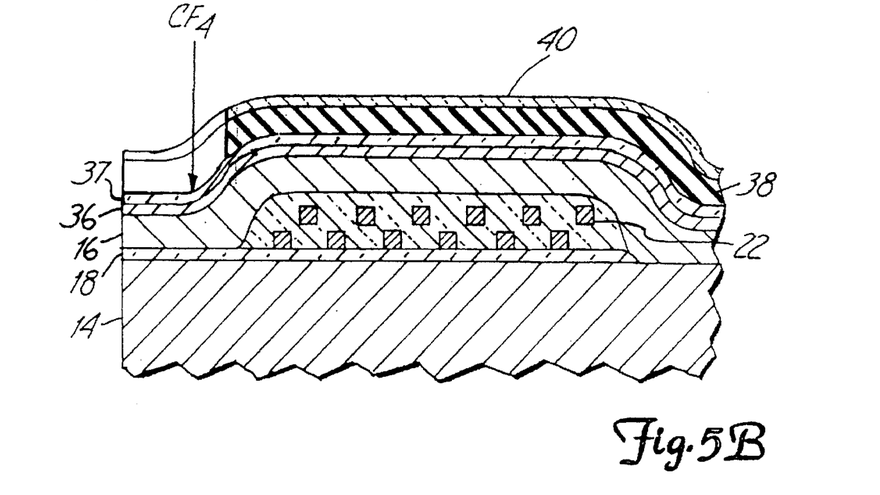
Figure 5C:
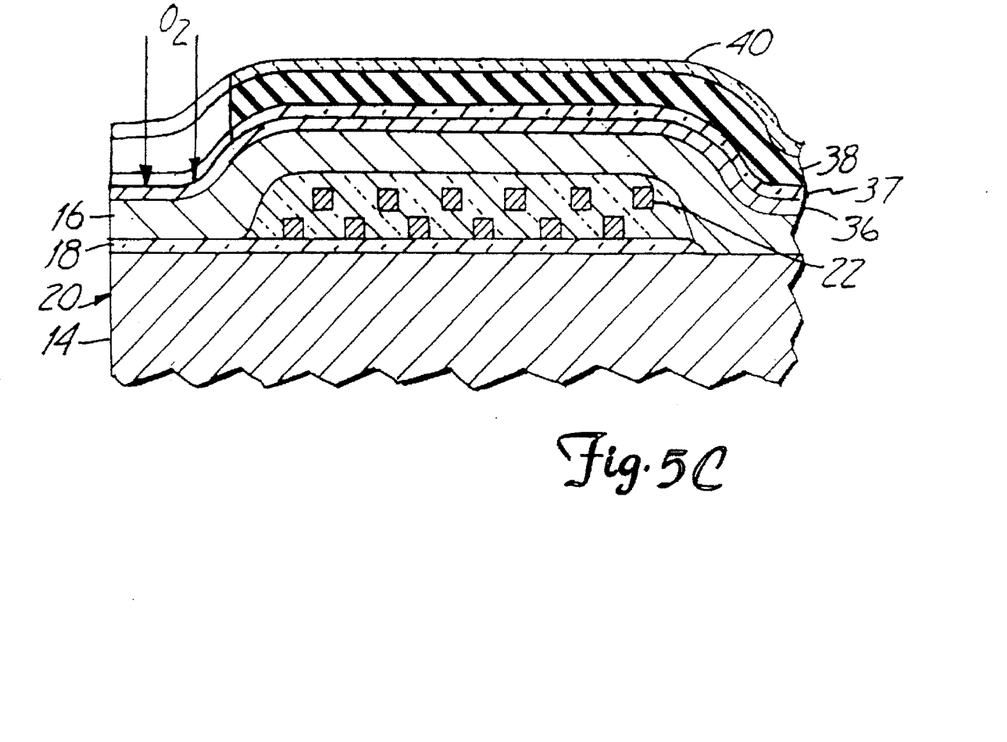
Figure 5D:
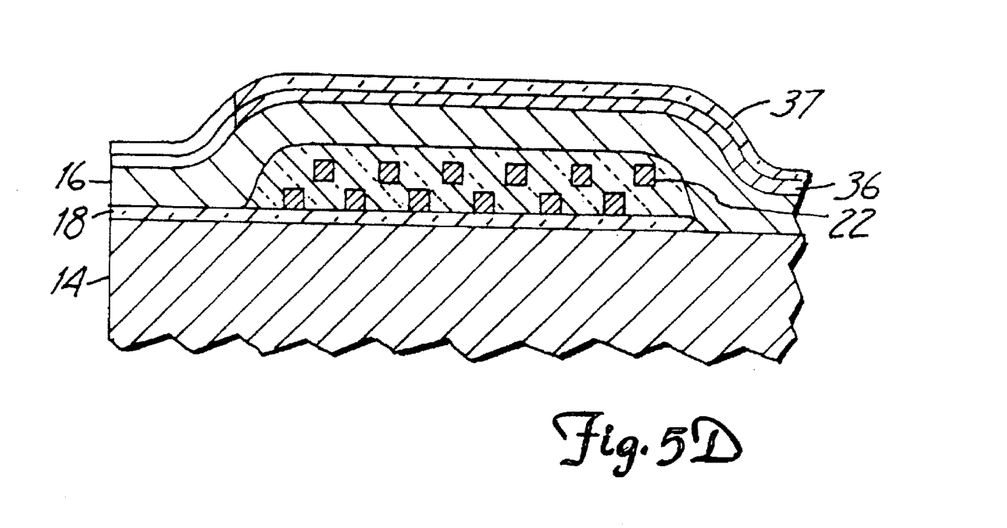

The principal difference of the process illustrated in FIGS. 5A–5D is the addition of insulating layer 37 over diamond-like carbon layer 36. Insulating layer 37 is a protective layer, preferably formed of silicon dioxide having a thickness of at least about 0.5 microns. One-half micron is considered minimal to overcome the pin hole effects of $SiO_2$. As shown in FIG. 5B, the process is essentially identical to that described in connection with FIGS. 4B, 4C, and 4D, except that when the silicon dioxide layer 37 is exposed, the silicon dioxide layer 37 is etched with a fluoride etchant, such as $CF_4$, and the exposed diamond-like carbon layer 36 is then etched with anisotropic oxygen etchant, as shown in FIG. 5C. The result, shown in FIG. 5D, comprising a bilayer mask of diamond-like carbon layer 36 over pole 16 and capped with silicon dioxide layer 37. Layer 37 protects layer 36 from oxygen etchant in the event that photoresist layer 38 is undercut by the oxygen etchant during the etching of layer 36. The resulting mask and structure shown in FIG. 5D is used as described in FIGS. 3B and 3C in an ion milling process to shape the top pole 16. $SiO_2$ has an ion mill rate higher than Ni/Fe. Consequently, the effect of layer 37 on the overall mill time is slight, although for an Ni/Fe pole thickness of 3 microns, the thickness of layer 36 of diamond-like material may be reduced to about 25% of the thickness of the pole, or about 0.8 microns for a 3 microns thick pole.

One feature of the invention is the fact that the diamond-like carbon is applied by an ion beam deposition directly onto layer 16. The simplicity of the ion beam process permits the formation of low defect films in the form of mask 36. Other techniques for applying the diamond-like carbon to layer 16 include radio frequency and direct current magnetron sputtering, carbon-arc deposition, laser ablation, and plasma enhanced chemical vapor deposition (PECVD).

Although the present invention has been described with reference to preferred embodiments, workers skilled in the art will recognize that changes may be made in form and detail without departing from the spirit and scope of the invention.

What is claimed is:

1. A process of forming a mask useful for ion milling magnetic material, the process comprising:

depositing a mask layer including a layer of thermally conductive, high electrical resistivity diamond-like carbon over the magnetic material;

applying a first layer of photoresist over the mask layer;

depositing a layer of insulating material over the first layer of photoresist;

applying a second layer of photoresist over the layer of insulating material;

patterning the second layer of photoresist to expose selected portions of the layer of insulating material;

removing the exposed portions of the layer of insulating material to expose portions of the first layer of photoresist;

removing the exposed portions of the first layer of photoresist to expose portions of the mask layer;

removing the exposed portions of the mask layer to expose portions of the magnetic material; and removing the remaining portions of the first layer of photoresist to remove remaining insulating material.

2. The process of claim 1, wherein the layer of insulating material is $SiO_2$ and the step of removing the exposed portions of the layer of insulating material comprises applying fluoride etchant to the exposed portions of the layer of insulating material.

3. The process of claim 2 wherein the fluoride etchant is $CF_4$.

4. The process of claim 1, wherein the step of removing exposed portions of the mask layer includes applying an anisotropic oxygen etchant to the layer of diamond-like carbon.

5. The process of claim 1, wherein the step of depositing a mask layer comprises depositing the layer of diamond-like carbon over the magnetic material and depositing a second layer of insulating material over the layer of diamond-like carbon, the insulating material of the second layer of insulating material being removable separate from the diamond-like carbon, and the step of removing exposed portions of the mask layer comprises removing the exposed portions of the second layer of insulating material to expose portions of the layer of diamond-like carbon and removing the exposed portions of the layer of diamond-like carbon to expose portions of the magnetic material.

6. The process of claim 5, wherein the second layer of insulating material is $SiO_2$ and the step of removing the exposed portions of the second layer of insulating material comprises applying fluoride etchant to the exposed portions of the second layer of insulating material.

7. The process of claim 6 wherein the fluoride etchant is $CF_4$.

8. The process of claim 5, wherein the step of removing exposed portions of the layer of diamond-like material includes applying an anisotropic oxygen etchant to the layer of diamond-like carbon.

9. The process of claim 5, wherein the layers of insulating material are formed of $SiO_2$ and the steps of removing the exposed portions of the layers of insulating material comprise applying fluoride etchant to the exposed portions of the respective layer of insulating material.

10. The process of claim 9 wherein the fluoride etchant is $CF_4$.

11. A process of ion milling a magnetic material to form a pole for a transducer, the magnetic material having a known thickness comprising:

forming a patterned mask on a surface of the magnetic material, the patterned mask being patterned to expose a desired shape of the pole and including a layer of thermally conductive, high electrical resistivity diamond-like carbon, the mask having a thickness greater than one-fifth the thickness of the magnetic material; and ion milling the exposed magnetic material and mask to shape the magnetic material to the desired shape to form the pole.

12. The process of claim 11, wherein the mask consists essentially of the layer of diamond-like carbon and has a thickness of about 30 percent of the thickness of the magnetic material.

13. The process of claim 11, wherein the mask includes a layer of insulating material over the layer of diamond-like carbon, the layer of insulating material having a thickness of at least about 0.5 microns and the layer of diamond-like carbon having a thickness of about 25% of the thickness of the magnetic material.

* * * * *

UNITED STATES PATENT AND TRADEMARK OFFICE
CERTIFICATE OF CORRECTION

PATENT NO. : 5,658,470
DATED : AUGUST 19, 1997
INVENTOR(S) : ALLAN E. SCHULTZ, L. VINCENT RUSCELLO. WILLIAM H. NUNNE

It is certified that error appears in the above-indentified patent and that said Letters Patent is hereby corrected as shown below:

On the Title Page "References Cited" FOREIGN PATENT DOCUMENTS delete "2 064 849", insert --2 064 849 A--

Col. 3, line 26, delete "at.", insert --al.--

Col. 3, line 60, delete "at.", insert --al.--

Signed and Sealed this

Seventh Day of April, 1998

Attest:

BRUCE LEHMAN

*Attesting Officer*    *Commissioner of Patents and Trademarks*